United States Patent [19]

Sayers

[11] Patent Number: 4,917,244
[45] Date of Patent: Apr. 17, 1990

[54] LIBRARY BOX CLOSURE DEVICE AND HANGER

[75] Inventor: Richard C. Sayers, Opelika, Ala.

[73] Assignee: Ampex Corporation, Redwood City, Calif.

[21] Appl. No.: 243,571

[22] Filed: Sep. 12, 1988

[51] Int. Cl.$^4$ .............................................. E04G 5/06
[52] U.S. Cl. .............................. 206/387; 248/225.2; 248/691; 292/209; 292/213; 292/DIG. 38
[58] Field of Search ................. 248/360, 225.1, 225.2; 206/387; 292/209, 213, DIG. 38; 220/18

[56] References Cited

U.S. PATENT DOCUMENTS

| | | | |
|---|---|---|---|
| 1,983,060 | 12/1934 | Zuckerman | 248/225.1 |
| 3,696,935 | 10/1972 | Dean | 206/400 X |
| 3,746,180 | 7/1973 | Spiroch et al. | 211/113 |
| 4,165,852 | 8/1979 | Chervenak | 248/225.2 |
| 4,177,896 | 12/1979 | Weavers et al. | 206/387 |
| 4,194,636 | 3/1980 | Byram et al. | 211/71 |
| 4,248,345 | 2/1981 | Bowers | 206/387 |
| 4,327,952 | 5/1982 | Cournoyer et al. | 206/387 X |
| 4,333,568 | 6/1982 | Weldin | 206/381 |
| 4,368,934 | 1/1983 | Somers | 206/387 X |
| 4,648,514 | 3/1987 | Niles | 211/41 |
| 4,711,419 | 12/1987 | Polosky | 248/360 |

Primary Examiner—Donald F. Norton
Attorney, Agent, or Firm—Harry G. Thibault; Richard P. Lange

[57] ABSTRACT

A closure device for a library storage box combines a hanger with a locking device for the closed storage box. A hinge structure for the device provides a first hinge portion on the box, connected by a flexible hinge to a second hinge carrying the hanger at its outer end. A latch on the second hinge portion engages a complementary detent on the first hinge portion to hold the box closed and to project the hanger to an engaging position for mounting on a suitable rail.

3 Claims, 2 Drawing Sheets

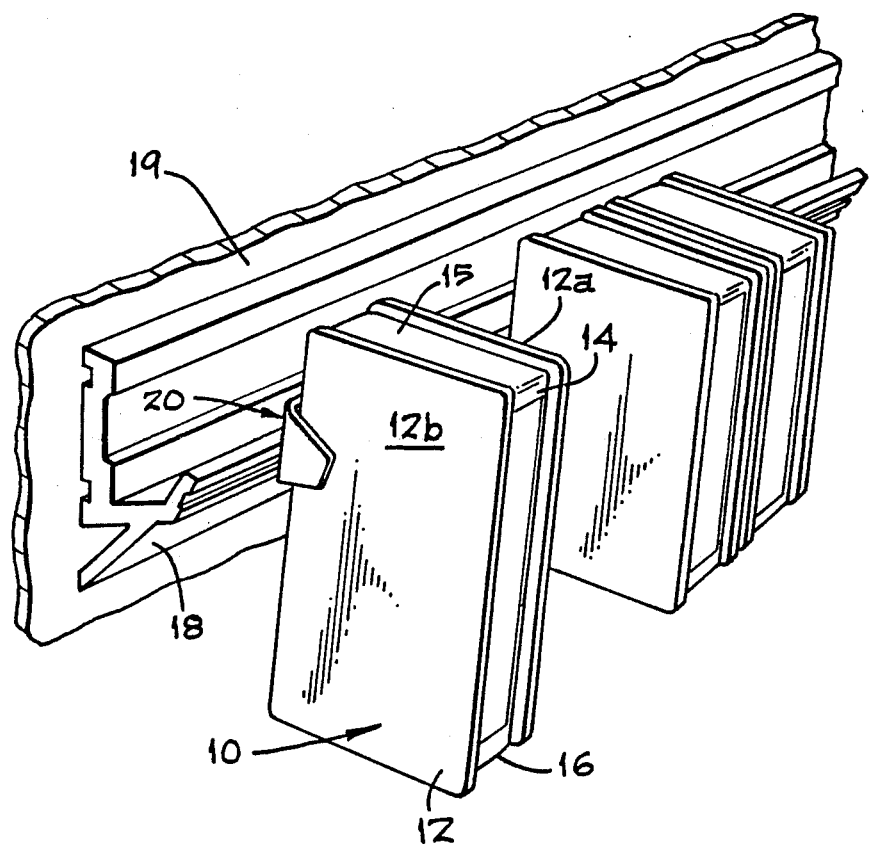
FIG_1
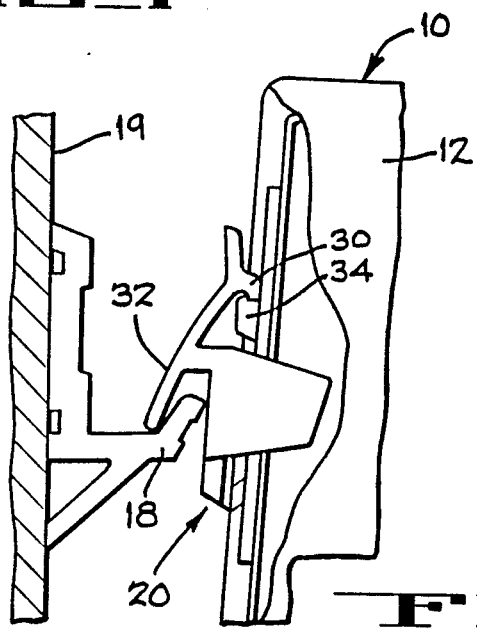
FIG_2

U.S. Patent  Apr. 17, 1990  Sheet 2 of 2  4,917,244
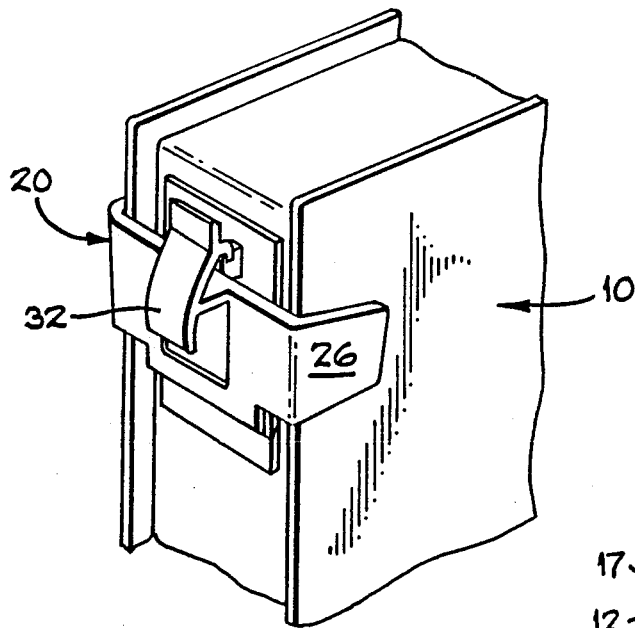
FIG_3
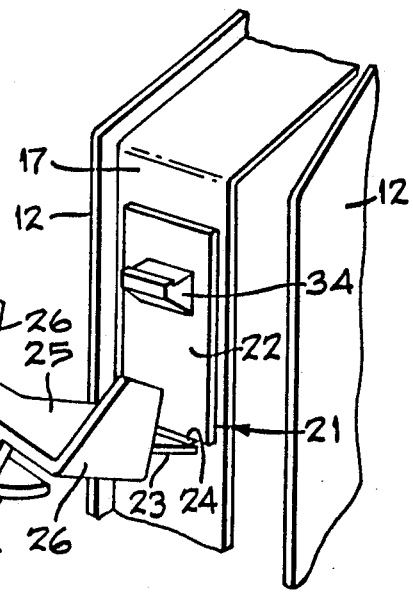
FIG_4
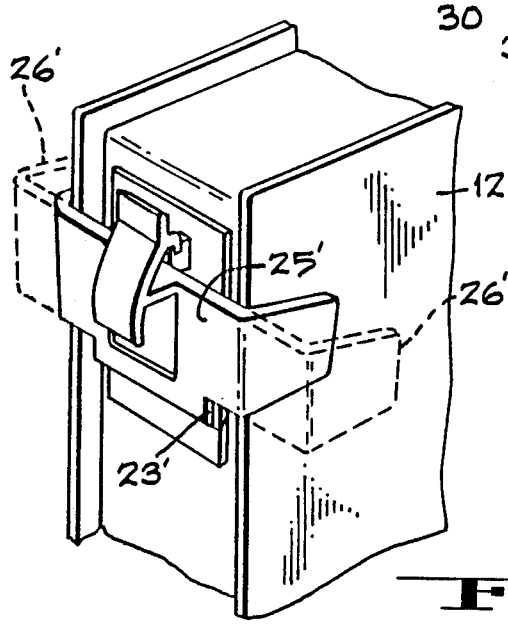
FIG_5

LIBRARY BOX CLOSURE DEVICE AND HANGER

This invention pertains to closure devices generally and in particular to a closure device for a cassette storage box incorporating a hanger as a portion thereof.

A library box for storing a video cassette in turn poses its own unique storage problems. Typically the cassette stored in the box is identified by a label displayed on the library storage box. However that label cannot be read if the storage boxes are stacked on the floor or stored away in a drawer. Thus, the preferred storage mode for a cassette-holding library box is in a manner which aligns all boxes so that the identifying label provided thereon can be easily read. For example, a series of closed, cassette-holding boxes may be hung in alignment on a hanger rail, with the rail positioned to display the cassette-identifying label on each box generally at eye level.

Although this sounds like a relatively simple concept, there have been many variations on such a theme. For example, the hanger has been integrated as a part of the storage box. In another configuration a specially formed rail receives a specially formed hanger mounted on the box. These solutions may require a uniquely formed hanger or a uniquely formed rail, or both. What is desired is a simple hanger device, which can be applied to any storage box of any suitable size and width for holding a cassette, such closure device including a hanger portion which can be suitably dropped onto a complementary rail to store each and every cassette using such closure device in alignment on the rail.

In the preferred embodiment of the present invention a closure device provides a first hinge portion mountable on a side wall of the library box, wherein said side wall is disposed away from the hinged rear side wall of the library box. A second hinge portion pivotable about the first hinge portion includes opposite end walls operable to engage and close opposite facing top and bottom covers of the closed library box to retain said library box in a closed position. A detent mounted on the second hinge portion engages a catch mounted on the first hinge portion to retain the closure device in a closed position to hold the library box closed. A hanger or hook portion extends outwardly from the closure device when it is holding the library box closed to engage a suitable rail for hanging the library box.

Although U.S. Pat. No. 3,696,935 entitled "Reel Sealing And Storage Apparatus" discloses certain features which are similar to some of the features in the present structure, important differences should be noted. In the above-noted patent the hanger is included in the circular closing band as part of that structure. The overlying strap engages a protruding portion of the hanger to retain hanger and strap under tension. Such features are not shown in the present invention. Moreover when the strap and hanger are under tension the reel could be said to be in a "closed" position. A comparable "closed" position for a library box would result in wrapping the band around the periphery of the box and along its width. However, even if the structure of the above-noted patent could be adapted to the library box, the box simply would not be closed, because the end walls attached to the second hinge portion of the closure device and which close the library box for the present invention are not present in the structure of the patent. Thus the device of U.S. Pat. No. 3,696,935 and the device of the present invention differ substantially in structure, purpose and design.

A more complete understanding of the present invention may be obtained by considering the following detailed description of the preferred embodiment, such description to be considered in conjunction with the accompanying drawings as described below.

DESCRIPTION OF THE DRAWINGS

FIG. 1 is a right front perspective view of a wall-mounted storage rail, with a plurality of library boxes mounted thereon, the closure of the present invention used to close the library boxes and to mount them on the rail;

FIG. 2 is a side elevation of a library box having the closure device of the present invention installed, said box mounted on the rail of FIG. 1 for storage;

FIG. 3 is a perspective view of the library box of FIGS. 1 and 2 with the closure device in place and said device locked to close the box;

FIG. 4 is a view similar to FIG. 3 wherein the closure device is opened to open the box and to show additional features of said device; and FIG. 5 is a detail of the hanger device to show the ability of such device to adapt to different size boxes.

DETAILED DESCRIPTION OF THE PREFERRED EMBODIMENTS

In FIGS. 1 to 4, a library box 10 for holding a device such as video cassette (not shown) is shown. The library box 10 includes opposite or facing covers or panels 12, separated by generally perpendicular side walls including a hinged rear wall 14, a top wall 15, a bottom wall 16, and a front wall 17, opposite the rear wall 14. Typically, the side walls 14–17 are attached to a bottom cover 12a, with a top cover 12b pivotable about the rear wall 14.

In order to mount the library box 10 on a suitable rail, such as the rail 18 mounted on wall 19, it is necessary to provide on the library box 10 a hanger 20. Further, it would be desirable if the hanger 20 provided a dual function such as engaging opposite panels 12 in a manner which retains the box 10 in a closed position. Therefore the hanger 20 should function not only as a hanger but also as a closure device 20 as well.

To provide a combination hanger and closure device 20, the closure device 20 is structured as follows. A first hinge portion 22 of a hinge structure 21 is mounted on one of the side walls between the facing panels 12, such as the front wall 17 opposite the hinged rear wall 14. A second hinge portion 23 of the hinge structure 21 is attached to the first hinge portion 22 by a lower flexible hinge 24. The second hinge portion 23 includes a generally planar wall 25, having at opposite ends, inwardly directed flanges 26 which extend outwardly and generally perpendicularly from second hinge portion 23 and toward first hinge portion 22 and the library box 10. Located above the flanges 26 is a latch or detent member 28 having a latch 30 at the inner face of one end and a hanger or back portion 32 at the outer face of the opposite end.

To latch the closure device 20, second hinge portion 23 is urged toward the first hinge portion 22 to permit opposite extending flanges 26 to enclose opposite or facing panels 12 of the library box 10 to retain the library box 10 in a closed position. The latch 30 engages a complimentary detent 34 provided on the first hinge portion 22 to retain the closure device 20 in a locked position holding the library box 10 in a closed position. In such closed position, the library box 10 and its attached closure device 20 can be mounted on the rail 18 by means of the hook portion 32.

As shown in FIG. 5, in a second embodiment of the present invention, a planar wall 25' of a second hinge portion 23' has been extended along the plane adjacent inwardly directed flanges 26' to permit a greater distance between the flanges 26' so as to accommodate larger sized library boxes 10'. This simple change is enough to accommodate boxes of all sizes since there is no need to substantially modify other dimensions of the closure device 20 to accommodate a larger library box 10'.

It would be noted that, since the closure device 20 is manufactured independently of the library box 10, such device 20 can be mounted on the library box 10 at the position most convenient to the user. Thus, if it would be more desirable to hang the library box 10 so that a label placed on the top wall 15 could be read, then the position of the closure device 20 as shown in FIG. 2 is most desirable. However, the closure device 20 can be mounted on the box 10 to tilt the rear wall 14 to a position most readable by the user.

Having described the preferred embodiment of the present invention, it should be understood that variations in structure and operation can be accommodated within such description. Accordingly, the scope of the present invention is defined by the appended claims.

What is claimed is:

1. A closure device mountable on a cassette storage box defined by opposite lateral covers separated by interposed side walls, with one side wall hinged to open and close the box, said device operable to effect closure of the box for storage, and including apparatus for hanging the closed storage box on a suitable apparatus for storage, said device comprising:
   a hinge structure;
   a first hinge portion of the hinge structure mountable on a side wall of the storage box and disposable opposite from the hinged side wall of the storage box;
   a second hinge portion of the hinge structure pivotable about the first hinge portion, said second hinge portion having opposite end walls operable to engage and enclose opposite facing lateral covers of the closed storage box to retain said storage box in the closed position;
   a first detent on the first hinge portion;
   a complementary detent on the second hinge portion; and
   a hook portion disposed on the second hinge portion, the complementary detents operable to retain the closure device in a locking position with respect to the cassette storage box and the hook portion operable for hanging the closed cassette storage box on a suitable apparatus for storage when the box is in the closed position.

2. A closure device as claimed in claim 1 wherein the opposite end walls of the second hinge portion include end flanges adapted to be directed inwardly toward the closed cassette box to engage and enclose the opposite facing lateral covers of the closed box in a locked position for the device.

3. A closure device as claimed in claim 2 wherein a connecting planar wall between the two inwardly directed end flanges can be of varying lengths to accommodate cassettes of varying sizes.

* * * * *